United States Patent
Bean et al.

(10) Patent No.: US 10,339,713 B2
(45) Date of Patent: Jul. 2, 2019

(54) MARKER POSITIONING FOR AUGMENTED REALITY OVERLAYS

(71) Applicant: International Business Machines Corporation, Armonk, NY (US)

(72) Inventors: Chris R. Bean, Chandler's Ford (GB); Sophie D. Green, Chelmsford (GB); Stephen R. F. Head, Southampton (GB); Madeleine R. Neil Smith, Eastleigh (GB)

(73) Assignee: International Business Machines Corporation, Armonk, NY (US)

(*) Notice: Subject to any disclaimer, the term of this patent is extended or adjusted under 35 U.S.C. 154(b) by 311 days.

(21) Appl. No.: 14/824,451

(22) Filed: Aug. 12, 2015

(65) Prior Publication Data
US 2017/0046876 A1    Feb. 16, 2017

(51) Int. Cl.
| | | |
|---|---|---|
| *G06F 3/00* | (2006.01) | |
| *G06F 3/01* | (2006.01) | |
| *G06T 19/00* | (2011.01) | |
| *G06F 3/0482* | (2013.01) | |
| *G06F 3/0484* | (2013.01) | |

(52) U.S. Cl.
CPC ............ *G06T 19/006* (2013.01); *G06F 3/005* (2013.01); *G06F 3/013* (2013.01); *G06F 3/017* (2013.01); *G06F 3/0482* (2013.01); *G06F 3/04842* (2013.01)

(58) Field of Classification Search
CPC .............................. G06T 19/006; G06F 3/0482
See application file for complete search history.

(56) References Cited

U.S. PATENT DOCUMENTS

| | | | | |
|---|---|---|---|---|
| 9,190,074 | B1* | 11/2015 | LeBeau | G06F 3/167 |
| 2011/0161875 | A1* | 6/2011 | Kankainen | G06F 3/0481 |
| | | | | 715/810 |
| 2012/0184352 | A1 | 7/2012 | Detlefsen et al. | |
| 2013/0135353 | A1* | 5/2013 | Wheeler | G09G 3/003 |
| | | | | 345/660 |
| 2014/0100994 | A1 | 4/2014 | Tatzel et al. | |
| 2015/0153913 | A1* | 6/2015 | Ballard | G02B 27/017 |
| | | | | 715/727 |

(Continued)

OTHER PUBLICATIONS

Tateno et al., "A Nested Marker for Augmented Reality", Proceeding SIGGRAPH '06 ACM SIGGRAPH 2006 Sketches, Article No. 152, ACM New York, NY, USA, © 2006, p. 1.

(Continued)

*Primary Examiner* — Jeffery A Brier
(74) *Attorney, Agent, or Firm* — Edward J. Wixted, III

(57) ABSTRACT

Methods, systems, and computer programs for nesting augmented reality markers within augmented reality overlays to create nested menu options in augmented reality applications are provided. An input image is received from an augmented reality input buffer. The input buffer is a digital representation of information taken from a camera. An output image including an overlay is received from an augmented reality output buffer. The output buffer is scanned for one or more markers, where the markers are associated with the overlay. A first user input is received, indicating a user selection of a first marker. A first marker overlay is displayed. The first marker overlay corresponds to the first marker.

17 Claims, 4 Drawing Sheets

(56) References Cited

U.S. PATENT DOCUMENTS

2016/0048732 A1* 2/2016 Matoba .................... G06T 7/73
  345/633

OTHER PUBLICATIONS

Thakar et al., "Navigating Multiple Augmented Reality Overlays through Occlusion-Based Triggers", MUM '14: Proceedings of the 13th International Conference on Mobile and Ubiquitous Multimedia, Nov. 25-28, 2014, Melbourne, VIC, Australia, Copyright is held by the owner/author(s), Nov. 2014, Publication rights licensed to ACM, p. 264-265.

Sugrue, "Chain on Responsibility Pattern Tutorial with Java Examples", DZone Java, Mar. 30, 2010, Last printed Nov. 29, 2016, 4:22 p.m., EST, 2 pages., http://dzone.com/articles/design-patterns-uncovered-chain-of-responsibility.

* cited by examiner

MARKER POSITIONING FOR AUGMENTED REALITY OVERLAYS

BACKGROUND OF THE INVENTION

The present invention relates generally to the field of augmented reality, and more particularly to the use of nested augmented reality markers within augmented reality overlays to create nested menu options in augmented reality applications.

Augmented reality (AR) is a view of a physical, real-world environment with elements augmented by a computer-generated sensory input. Computer-generated sensory inputs can include sound, video, graphics, or global positioning system (GPS) data. Generally, augmentation is in real-time and in semantic context with environmental elements. Often, AR display devices can align virtual information with the physical world. In some examples, virtual information is layered over the physical world view on a computing device. The virtual information layer is an overlay.

SUMMARY

According to one embodiment of the present invention, a method for nesting augmented reality overlays is provided. The method includes receiving, by one or more processors, an input image from an augmented reality input buffer, wherein the input buffer is a digital representation of information taken from a camera; receiving, by one or more processors, an output image from an augmented reality output buffer, wherein the output buffer comprises an overlay; scanning, by one or more processors, the output buffer image for one or more markers, wherein the one or more markers are associated with one or more marker overlays; receiving, by one or more processors, a first user input, wherein the first user input indicates a user selection of a first marker of the one or more markers; and displaying, by one or more processors, a first marker overlay, wherein the first marker overlay is associated with the first marker.

According to another embodiment of the present invention, a computer program product for nesting augmented reality overlays is provided. The computer program product comprises a computer readable storage medium and program instructions stored on the computer readable storage medium. The program instructions include program instructions to receive an input image from an augmented reality input buffer, wherein the input buffer is a digital representation of information taken from a camera; program instructions to receive an output image from an augmented reality output buffer, wherein the output buffer comprises an overlay; program instructions to scan the output buffer image for one or more markers, wherein the one or more markers are associated with one or more marker overlays; program instructions to receive a first user input, wherein the first user input indicates a user selection of a first marker of the one or more markers; and program instructions to display a first marker overlay, wherein the first marker overlay is associated with the first marker.

According to another embodiment of the present invention, a computer system for nesting augmented reality overlays is provided. The computer system includes one or more computer processors, one or more computer readable storage media, and program instructions stored on the computer readable storage media for execution by at least one of the one or more processors. The program instructions include program instructions to program instructions to receive an input image from an augmented reality input buffer, wherein the input buffer is a digital representation of information taken from a camera; program instructions to receive an output image from an augmented reality output buffer, wherein the output buffer comprises an overlay; program instructions to scan the output buffer image for one or more markers, wherein the one or more markers are associated with one or more marker overlays; program instructions to receive a first user input, wherein the first user input indicates a user selection of a first marker of the one or more markers; and program instructions to display a first marker overlay, wherein the first marker overlay is associated with the first marker.

DETAILED DESCRIPTION

Augmented reality (AR) displays enable a user to merge real world experience with a virtual world via a visual overlay to supplement what the user views. Connection to various databases, via a computer network, allows AR displays to add information to the user's view through an overlay. For example, if a user's view includes a landmark, the AR overlay may provide historical facts, visitor center information, etc. An embodiment of the present invention recognizes that AR overlays can enhance user experiences. AR overlays are produced based on markers associated with physical indicators in the real world. In some embodiments, the marker is a computer generated user interface element shown in the AR display. Generally, information associated with a marker is displayed on the AR display when a user interacts with the marker (e.g., the user focuses on the marker for a predetermined time). However, an embodiment of the present invention recognizes that all information associated with a marker is generally displayed simultaneously. Some embodiments recognize that the information associated with a marker can take up a large portion of the AR display. Further recognized, downloading information associated with a marker consumes computing resources, which is wasteful if the user is interested in only a sub-set of the information.

An embodiment of the present invention provides nested markers within AR overlays. The nested markers are used to create multi-level AR overlays. For example, multi-level overlays are used to create nested menus. Nested marker overlays allow information associated with a physical object to be shown in smaller increments. For example, where a user views a landmark, a marker associated with the landmark provides a menu. The menu may have multiple markers, each associated with a menu option. Nested markers allows the user to choose what information is shown. In some embodiments, nested markers conserves resources, where the user does not want to download all of the information. In some embodiments, nested markers can conserve space on the AR display. For example, a small portion of the information, pertaining to one of the menu options, is displayed on the AR display.

Figure 1:
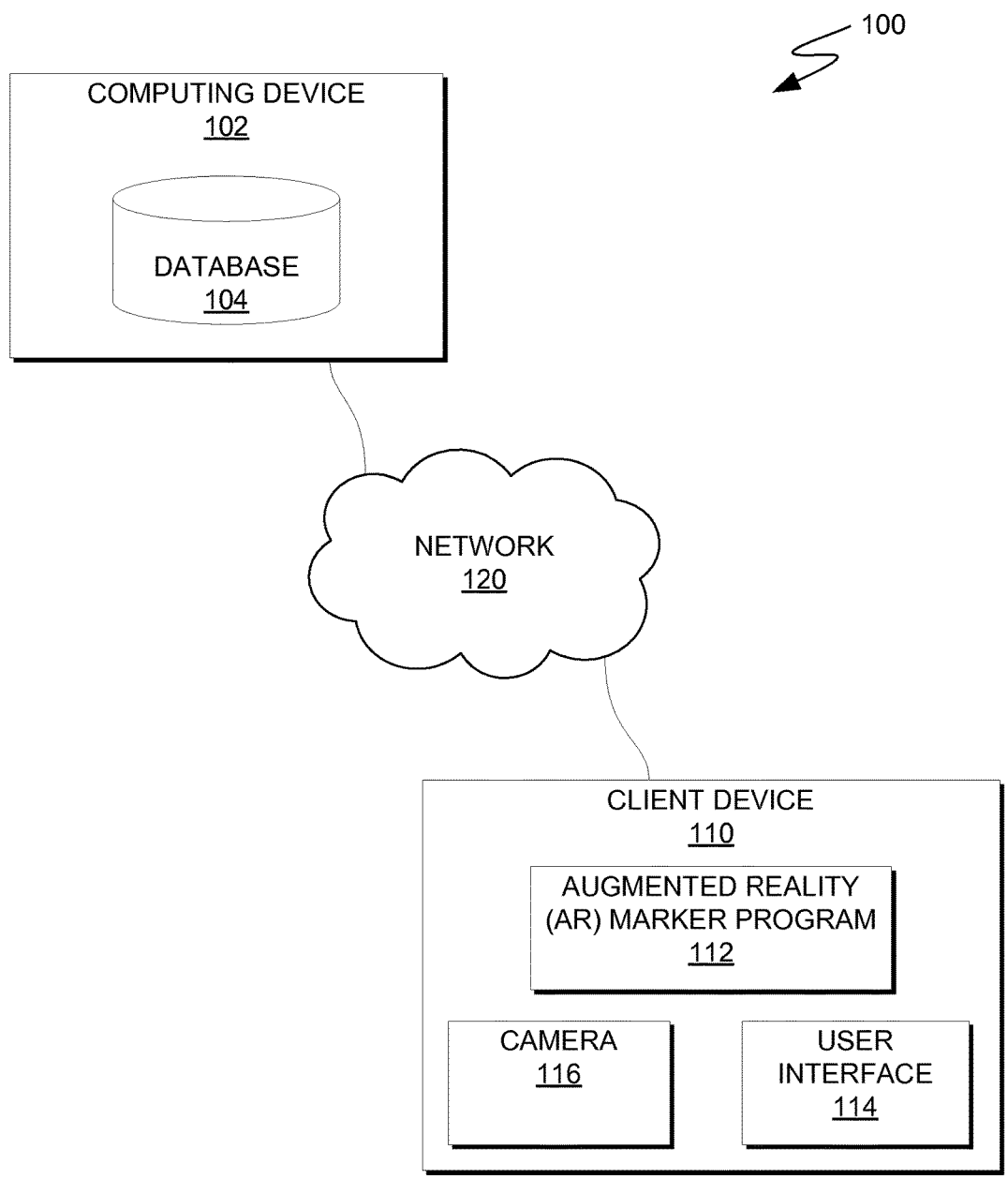
FIG. 1 is a functional block diagram illustrating a computing environment, in accordance with an embodiment of the present invention.

The present invention will now be described in detail with reference to the Figures. FIG. 1 is a functional block diagram illustrating a computing environment, in accordance with an embodiment of the present invention. For example, FIG. 1 is a functional block diagram illustrating augmented reality computing environment 100. Augmented reality computing environment 100 includes computing device 102 and client device 110 connected over network 120. Computing device 102 includes database 104.

In various embodiments, computing device 102 is a computing device that can be a standalone device, a server, a laptop computer, a tablet computer, a netbook computer, a personal computer (PC), or a desktop computer. In another embodiment, computing device 102 represents a computing system utilizing clustered computers and components to act as a single pool of seamless resources. In general, computing device 102 can be any computing device or a combination of devices with access to client device 110, and with access to and/or capable of executing database 104. Computing device 102 may include internal and external hardware components, as depicted and described in further detail with respect to FIG. 4.

In this exemplary embodiment, database 104 stored on computing device 102. In other embodiments, database 104 may reside on another computing device, provided that database 104 can access and is accessible by each of augmented reality (AR) marker program 112 and camera 116. In yet other embodiments, database 104 may be stored externally and accessed through a communication network, such as network 120. Network 120 can be, for example, a local area network (LAN), a wide area network (WAN) such as the Internet, or a combination of the two, and may include wired, wireless, fiber optic or any other connection known in the art. In general, network 120 can be any combination of connections and protocols that will support communications between computing device 102 and client device 110, in accordance with a desired embodiment of the present invention.

In one embodiment, database 104 resides on computing device 102. In another embodiment, database 104 resides on client device 110, or on another device or component (not shown) within augmented reality computing environment 100 accessible via network 120. Database 104 is a data repository that may be written to and read by AR marker program 112 and camera 116. Database 104 can be implemented with any type of storage device capable of storing data that may be accessed and utilized by computing device 102, such as a database server, a hard disk drive, or a flash memory. In other embodiments, database 104 can represent multiple storage devices within computing device 102. Database 104 stores data regarding AR overlays, markers, and information related to objects and locations that a user of client device 110 may access or view. Database 104 may receive updates, via network 120, regarding new objects and locations, as well as additional information related to objects and locations that are currently stored.

In various embodiments of the present invention, client device 110 can be a laptop computer, a tablet computer, a netbook computer, a personal computer (PC), a desktop computer, a personal digital assistant (PDA), a smart phone, or any programmable electronic device capable of communicating with computing device 102 via network 120. Client device 110 can be a wearable computer. Wearable computers are electronic devices worn by the user (e.g., as glasses, hats, clothing, accessories, etc.). In general, client device 110 represents any programmable electronic device or combination of programmable electronic devices capable of executing machine readable program instructions and communicating with other computing devices via a network, such as network 120. Client device 110 includes AR marker program 112, user interface 114, and camera 116. Client device 110 may include internal and external hardware components, as depicted and described in further detail with respect to FIG. 4.

AR marker program 112 operates identify markers in AR overlays. The AR display is comprised of two components: an input buffer and an output buffer. The input buffer is the digital representation of information taken from the device's camera. For example, the input buffer includes a user's view of the real world created by camera 116. In some embodiments, a marker is associated with elements of the input buffer. When AR marker program 112 identifies a marker in the input buffer, the overlay for the marker is generated. The output buffer is the digital representation of the computer generated image that the user sees through the device. For example, the overlays are elements of the output buffer. In some embodiments, markers are associated with areas or elements of the overlay. In some embodiments, AR marker program 112 identifies markers in the overlay and generates a new overlay.

Client device 110 includes a user interface (UI) 114, which includes software, hardware, or a combination thereof. Software of user interface 114 executes locally on client device 110 and operates to provide a UI to a user of client device 110. User interface 114 further operates to receive user input from a user via the provided user interface, thereby enabling the user to interact with client device 110. In one embodiment, user interface 114 provides a user interface that enables a user of client device 110 to interact with AR marker program 112 of client device 110. In various examples, the user interacts with AR marker program 112 in order configure markers within an AR overlay. In one embodiment, user interface 114 includes software stored on client device 110. In other embodiments, user interface 114 includes software stored on another computing device (e.g., computing device 102), provided that software of user interface 114 can access and is accessible by at least AR marker program 112.

In some embodiments, user interface 114 is a graphical user interface used to display augmented reality visuals to a user. For example, in some embodiments, one or both of the input buffer and output buffer are displayed on user interface 114 In other embodiments, user interface includes one or more interface devices used to enable user interaction with client device 110. In various embodiments, user interface 114 includes one or more input/output devices, human interface devices, pointing devices, sensors, or any combination thereof. For example, in some embodiments, user interface 114 includes a sensor that tracks a user's eye movement. The sensor can allow the user to interact with client device 110 through eye movement. In another embodiment, user interface 114 includes a microphone to enable the user to interact with client device 110 through voice commands.

Client device 110 includes camera 116. In some embodiments, camera 116 resides on another device or component, so long as camera 116 can access and is accessible by AR marker program 112. Camera 116 captures the user's real world view. Images captured by camera 116 are converted to a digital representation that is the input buffer.

Figure 2:
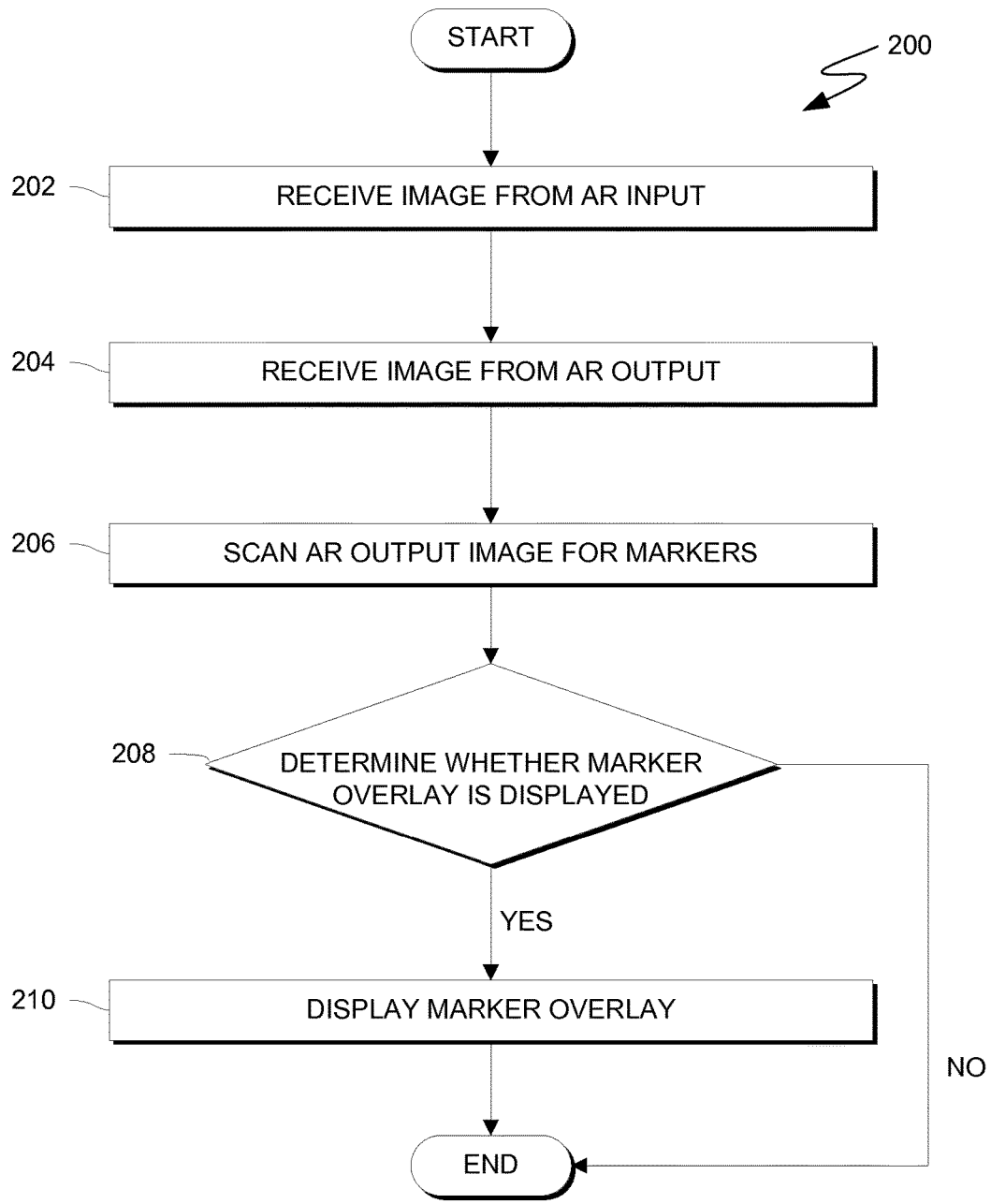
FIG. 2 is a flowchart depicting operations for positioning markers in augmented reality overlays, on a computing device within the computing environment of FIG. 1, in accordance with an embodiment of the present invention.

FIG. 2 is a flowchart depicting operations for positioning markers in augmented reality overlays, on a computing device within the computing environment of FIG. 1, in accordance with an embodiment of the present invention. For example, FIG. 2 is a flowchart depicting operations 200 of AR marker program 112, on computing device 102 within computing environment 100.

In step 202, AR marker program 112 receives an image from an AR input buffer. The AR input buffer is the digital representation of the information taken from the device's camera. In some embodiments, the input buffer contains an element of an image associated with one or more markers. AR marker program 112 identifies an element in the input buffer image associated with a marker. A user is able to interact with the marker in response to a user action. For example, where client device 110 includes an eye tracking sensor, the user interaction may be to look at the marker. In another example, the user interaction may be a voice command. In yet another example, the user interaction may be a user selection with a computer pointing device (e.g., a computer mouse, a touchscreen, etc.).

In step 204, AR marker program 112 receives an image from an AR output buffer. The AR output buffer is a digital representation of computer generated content that the user sees through the device. For example, an AR overlay is a component of the AR output buffer. In some embodiments, AR marker program 112 receives the AR output buffer image in response to a user interaction with the AR input buffer image. In some embodiments, the AR output buffer image has one or more embedded markers.

In step 206, AR marker program 112 scans the AR output buffer image for markers. AR marker program 112 identifies the number of markers embedded in the AR output buffer image and the locations of each marker. Each marker embedded in the AR output buffer image is associated with a marker overlay.

In decision 208, AR marker program 112 determines whether to display a marker overlay. If AR marker program 112 determines that a marker overlay should be displayed (decision 208, YES branch), then AR marker program 112 displays the marker overlay. In some embodiments, digital markers are placed in the output buffer. In one embodiment, where the output buffer is a menu, a marker is placed next to each of menu options. In another embodiment, one or more markers are placed in the output buffer, where each marker corresponds to an element of the output buffer. In one embodiments, AR marker program 112 determines whether to display a marker overlay based on a user input. In some embodiments, the user input indicates a user selection of a marker in the AR output buffer image. In some embodiments, the user indicates a selection via user interface 114. For example, where user interface 114 includes a sensor for tracking eye movement, a user selection can be indicated by the user maintaining eye contact with a marker for a predetermined period of time. In another example, where user interface 114 includes a microphone, a user selection can be indicated by voice command. In still another example, a user selection can be indicated by a point device (e.g., a touch screen, a computer mouse, etc.). If AR marker program 112 determines that a marker overlay should not be displayed (decision 208, NO branch), then a marker overlay is not generated in output buffer. Where a marker overlay is not displayed, operations 200 end.

In step 210, AR marker program 112 displays a marker overlay. In response to a user input indicating a selection, a marker overlay is displayed on a user interface. In some embodiments, the marker overlay includes one or more markers. In these embodiments, the user input can be used to select a marker to generate another marker overlay. In some embodiments, the marker overlay includes a marker that allows the user to close the marker overlay or return to the previous overlay.

Figure 3:
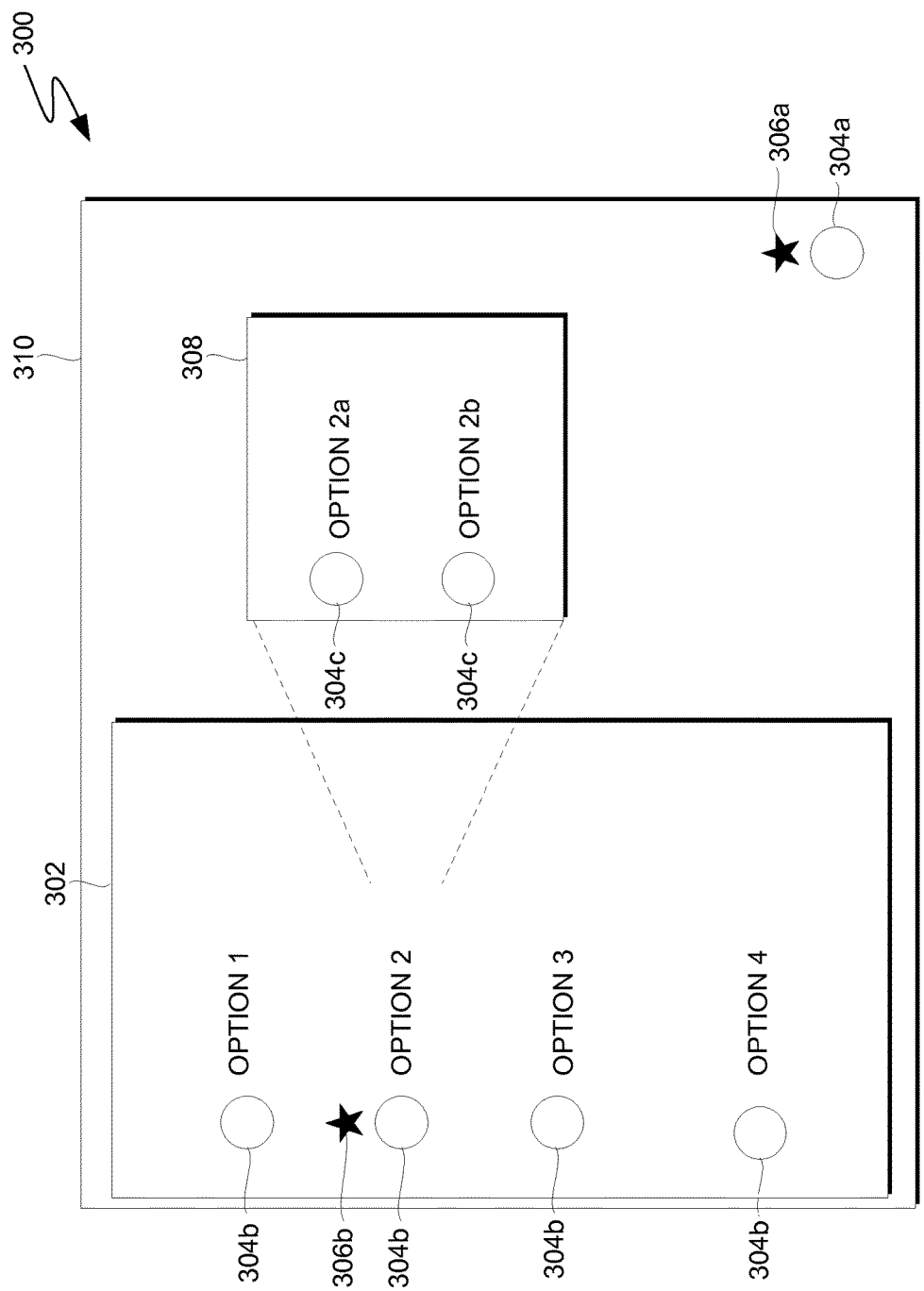
FIG. 3 is an example augmented reality overlay presenting nested markers, in accordance with an embodiment of the present invention.

FIG. 3 is an example augmented reality overlay presenting nested markers, in accordance with an embodiment of the present invention. For example, FIG. 3 is an example AR overlay depicting operations 200 of AR marker program 112, on computing device 102 within computing environment 100. FIG. 3 includes AR input buffer image 310, AR overlay 302 and AR marker overlay 308.

AR input buffer image 310 is a sample of the image received by the AR input buffer. AR input buffer image 310 is the digital representation of the user's real world view. AR input buffer image 310 is retrieved using camera 116 on client device 110. AR input buffer image 310 includes marker 304a and indicator 306a. In some embodiments, marker 304a is associated with an object in AR input buffer image 310. Indicator 306a indicates a location of a first user interaction with AR input buffer image 310. In some embodiments, the location of indicator 306a is representative of a user's interaction (e.g., user focus), based on data from an eye tracking sensor at the time of the first user interaction. In other embodiments, the location of indicator 306a is based on a user interaction with a pointing device.

AR overlay 302 is a sample overlay produced by the AR output buffer. AR overlay 302 is generated by AR marker program 112 in response to a user interaction with a marker in AR input buffer image 310 (e.g., marker 304a). AR overlay 302 includes one or more markers 304b. Each marker 304b is associated with an AR marker overlay. A user interaction with marker 304b causes an AR marker overlay to be generated. Indicator 306b indicates a location of a second user interaction with AR overlay 302. In some embodiments, the location of indicator 306b is representative of a user's focus, based on data from an eye tracking sensor at the time of the second user interaction. In other embodiments, the location of indicator 306b is based on a user interaction with a pointing device.

AR marker overlay 308 is a sample marker overlay produced by the AR output buffer. AR marker overlay 308 is generated by AR marker program 112 in response to a user interaction with a marker in AR overlay 302 (e.g., marker 304b "Option 2"). In some embodiments, AR marker overlay 308 includes one or more markers 304c. Each marker 304c is associated with an AR marker overlay. In some embodiments, marker 304c is an option to close AR marker overlay 308 and return to AR overlay 302.

Figure 4:
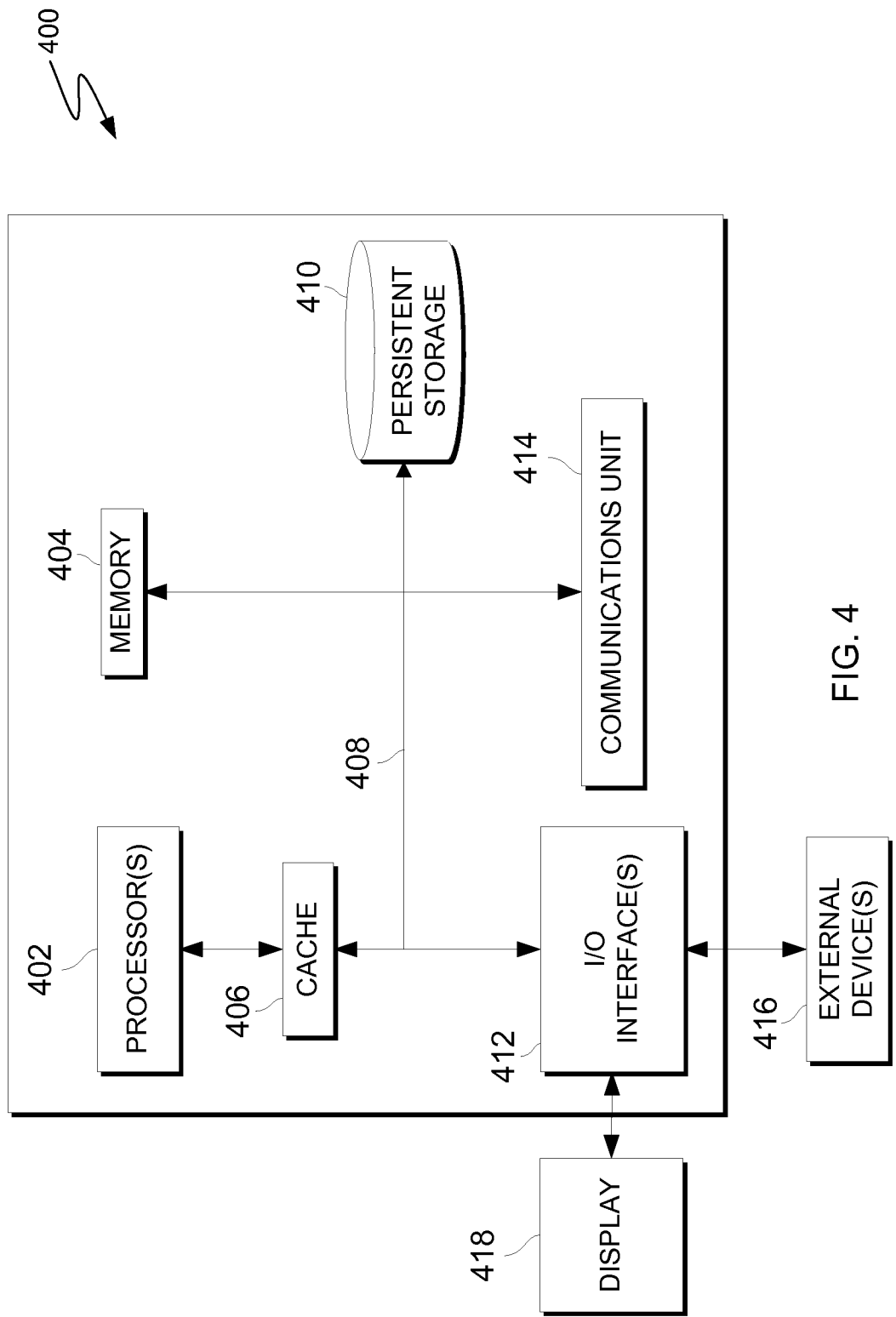
FIG. 4 is a block diagram of components of a computing device executing operations for positioning markers in augmented reality overlays, in accordance with an embodiment of the present invention.

FIG. 4 is a block diagram of components of a computing device, generally designated 400, in accordance with an embodiment of the present invention. In one embodiment, computing device 400 is representative of client device 110. For example, FIG. 4 is a block diagram of computing device 102 within computing environment 100 executing operations of AR marker program 112.

It should be appreciated that FIG. 4 provides only an illustration of one implementation and does not imply any limitations with regard to the environments in which different embodiments may be implemented. Many modifications to the depicted environment may be made.

Computing device 400 includes communications fabric 408, which provides communications between computer processor(s) 402, memory 404, cache 406, persistent storage 410, communications unit 414, and input/output (I/O) interface(s) 412. Communications fabric 408 can be implemented with any architecture designed for passing data and/or control information between processors (such as microprocessors, communications and network processors, etc.), system memory, peripheral devices, and any other hardware components within a system. For example, communications fabric 408 can be implemented with one or more buses.

Memory 404 and persistent storage 410 are computer-readable storage media. In this embodiment, memory 404 includes random access memory (RAM). In general, memory 404 can include any suitable volatile or non-volatile computer readable storage media. Cache 406 is a fast memory that enhances the performance of processors 402 by holding recently accessed data, and data near recently accessed data, from memory 404.

Program instructions and data used to practice embodiments of the present invention may be stored in persistent storage 410 and in memory 404 for execution by one or more of the respective processors 402 via cache 406. In an embodiment, persistent storage 410 includes a magnetic hard disk drive. Alternatively, or in addition to a magnetic hard disk drive, persistent storage 410 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 410 may also be removable. For example, a removable hard drive may be used for persistent storage 410. Other examples include optical and magnetic disks, thumb drives, and smart cards that are inserted into a drive for transfer onto another computer-readable storage medium that is also part of persistent storage 410.

Communications unit 414, in these examples, provides for communications with other data processing systems or devices, including resources of network 120. In these examples, communications unit 414 includes one or more network interface cards. Communications unit 414 may provide communications through the use of either or both physical and wireless communications links. Program instructions and data used to practice embodiments of the present invention may be downloaded to persistent storage 410 through communications unit 414.

I/O interface(s) 412 allows for input and output of data with other devices that may be connected to computing device 400. For example, I/O interface 412 may provide a connection to external devices 416 such as a keyboard, keypad, a touch screen, and/or some other suitable input device. External devices 416 can also include portable computer-readable storage media such as, for example, thumb drives, portable optical or magnetic disks, and memory cards. Software and data used to practice embodiments of the present invention (e.g., software and data) can be stored on such portable computer-readable storage media and can be loaded onto persistent storage 410 via I/O interface(s) 412. I/O interface(s) 412 also connect to a display 418.

Display 418 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
    receiving, by one or more processors, an input image, that includes an element, from an augmented reality input buffer, wherein the input buffer is a digital representation of information, including the element, taken from a camera;
    receiving, by one or more processors, an output image from an augmented reality output buffer, wherein:
        the output buffer comprises an overlay; and
        the overlay comprises information about the element;
    scanning, by one or more processors, the output buffer image for one or more markers, wherein the one or more markers are associated with one or more marker overlays;
    receiving, by one or more processors, a first user input, wherein the first user input indicates a user selection of a first marker of the one or more markers; and
    displaying, by one or more processors, a first marker overlay, wherein the first marker overlay:
        is associated with the first marker; and
        includes additional information about the element.

2. The method of claim 1, wherein the input image comprises at least one image marker, and wherein the at least one image marker is associated with the element in the input image.

3. The method of claim 1, wherein the first user input is based on eye tracking data.

4. The method of claim 1, wherein the first user input is based on gesture recognition data.

5. The method of claim 2, wherein receiving the output image from the augmented reality output buffer further comprises:
    receiving, by one or more processors, a second user input, wherein the second user input indicates a user selection of a first image marker of the at least one image marker; and
    in response to the user selection of the first image marker, generating, by one or more processors, the augmented reality output buffer.

6. The method of claim 5, wherein each of the one or more markers corresponds to an element of the output buffer.

7. A computer program product, the computer program product comprising:
    a computer readable storage medium, wherein the computer readable storage medium is not a transitory signal per se, and program instructions stored on the computer readable storage medium, the program instructions comprising:
    program instructions to receive an input image, that includes an element, from an augmented reality input buffer, wherein the input buffer is a digital representation of information, including the element, taken from a camera;
    program instructions to receive an output image from an augmented reality output buffer, wherein:
        the output buffer comprises an overlay; and
        the overlay comprises information about the element;
    program instructions to scan the output buffer image for one or more markers, wherein the one or more markers are associated with one or more marker overlays;
    program instructions to receive a first user input, wherein the first user input indicates a user selection of a first marker of the one or more markers; and program instructions to display a first marker overlay, wherein the first marker overlay:
  is associated with the first marker; and
  includes additional information about the element.

8. The computer program product of claim 7, wherein the input image comprises at least one image marker, and wherein the at least one image marker is associated with the element in the input image.

9. The computer program product of claim 7, wherein the first user input is based on eye tracking data.

10. The computer program product of claim 7, wherein the first user input is based on gesture recognition data.

11. The computer program product of claim 8, wherein program instructions to receive the output image from the augmented reality output buffer further comprise:
  program instructions to receive a second user input, wherein the second user input indicates a user selection of a first image marker of the at least one image marker; and
  in response to the user selection of the first image marker, program instructions to generate the augmented reality output buffer.

12. The computer program product of claim 11, wherein each of the one or more markers corresponds to an element of the output buffer.

13. A computer system, the computer system comprising:
  one or more computer processors;
  one or more computer readable storage media;
  program instructions stored on the computer readable storage media for execution by at least one of the one or more processors, the program instructions comprising:
  program instructions to receive an input image, that includes an element, from an augmented reality input buffer, wherein the input buffer is a digital representation of information, including the element, taken from a camera;
  program instructions to receive an output image from an augmented reality output buffer, wherein:
    the output buffer comprises an overlay; and
    the overlay comprises information about the element;
  program instructions to scan the output buffer image for one or more markers, wherein the one or more markers are associated with one or more marker overlays;
  program instructions to receive a first user input, wherein the first user input indicates a user selection of a first marker of the one or more markers; and
  program instructions to display a first marker overlay, wherein the first marker overlay:
    is associated with the first marker; and
    includes additional information about the element.

14. The computer system of claim 13, wherein the input image comprises at least one image marker, and wherein the at least one image marker is associated with the element in the input image.

15. The computer system of claim 13, wherein the first user input is based on eye tracking data.

16. The computer system of claim 13, wherein the first user input is based on gesture recognition data.

17. The computer system of claim 14, wherein program instructions to receive the output image from the augmented reality output buffer further comprise:
  program instructions to receive a second user input, wherein the second user input indicates a user selection of a first image marker of the at least one image marker; and
  in response to the user selection of the first image marker, program instructions to generate the augmented reality output buffer.

* * * * *